GEORGE W. RAY.
Improvement in Axles for Carriage-Wheels.
No. 126,742. Patented May 14, 1872.
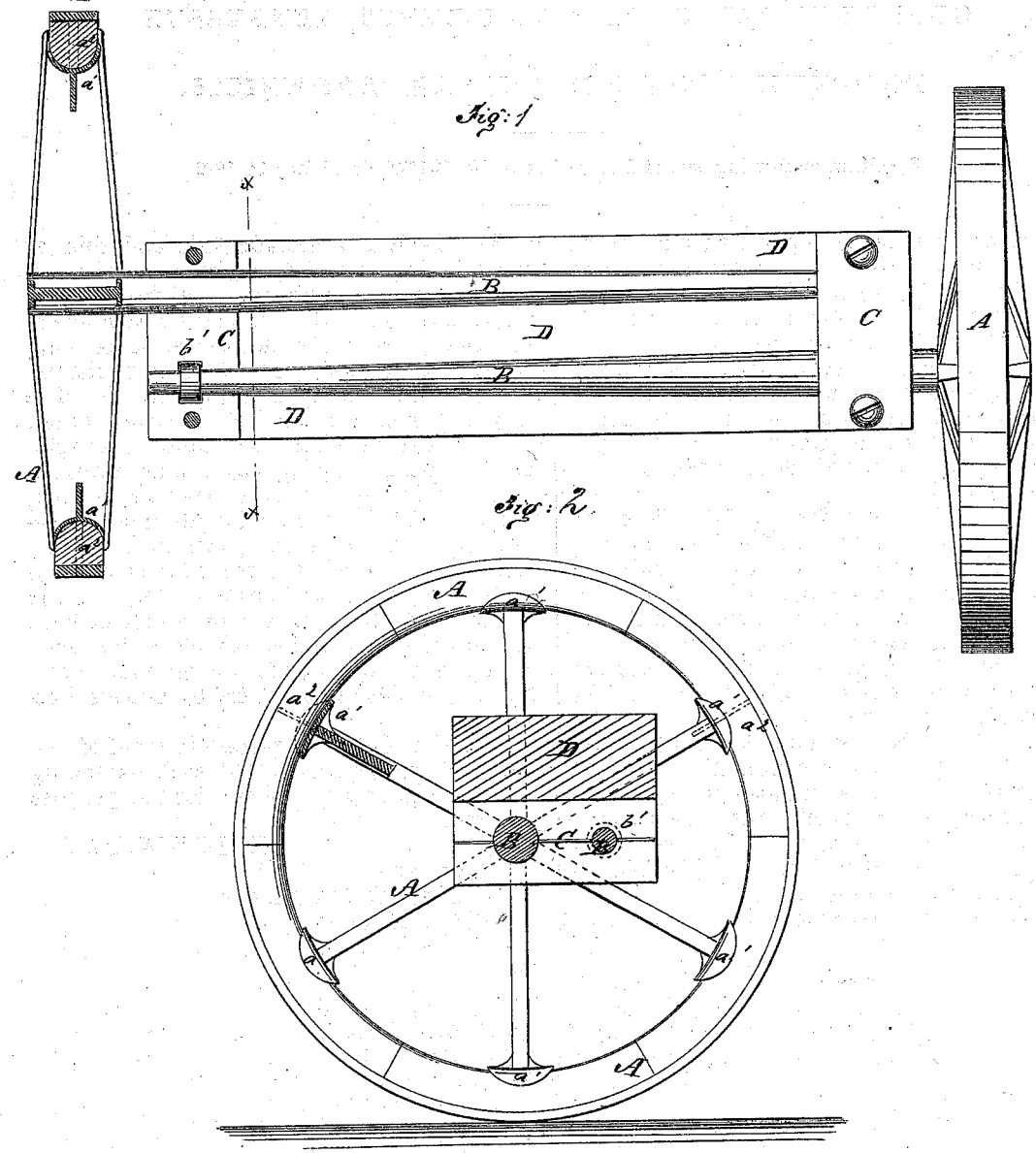

UNITED STATES PATENT OFFICE.

GEORGE W. RAY, OF RANKIN'S DEPOT, TENNESSEE.

IMPROVEMENT IN AXLES FOR CARRIAGE-WHEELS.

Specification forming part of Letters Patent No. 126,742, dated May 14, 1872.

Specification describing a new and useful Improvement in Wheels and Axles, invented by GEORGE W. RAY, of Rankin's Depot, in the county of Cocke and State of Tennessee.

Figure 1 is an under-side view of my improved wheels and axles. Fig. 2 is a detail sectional view of the same taken through the line $xx$, Fig. 1, part of one spoke being broken away to show the construction.

Similar letters of reference indicate corresponding parts.

The invention will first be fully described and then clearly pointed out in the claim.

A are the wheels, which are cast with or upon, or are shrunk upon, the ends of the axles or spindles B, so as to be a solid part of or immovably attached to said spindles. The outer ends of the spokes of the wheels A are cast with caps or flanges $a^1$ to form seats for the wooden fellies, the end of said seats being supported by ribs cast upon the sides of the ends of the spokes, as shown in Figs. 1 and 2. The ends of the spokes are also provided with projecting pins $a^2$, which enter the wooden fellies and keep them in place upon said spokes. The wooden fellies are further secured in place by tires, which are shrunk upon them in the ordinary manner. The spokes of the wheels A are made wide and thin, as shown in Figs. 1 and 2, to give them the necessary strength and lightness. B are the axles or spindles, one of which is used for each wheel, A. The axles or spindles B are made long, and revolve in bearings C attached to the under side of the wooden axle or bolster D. The axles B are placed parallel with each other, and in the same horizontal plane. The spindles B, when made long, may be made tapering or of uniform diameter, as may be desired, and they are kept from longitudinal movement in their bearings by collars $b'$ formed upon their journals and working in grooves in their bearings, as shown in Fig. 1. The collars $b'$ may be formed upon either or both journals of each spindle, as may be desired.

Having thus described my invention, I claim as new and desire to secure by Letters Patent—

The axles A A, one placed in front of the other, in bearings C C, and each extending across the bolster D, as and for the purpose set forth.

GEORGE W. RAY.

Witnesses:
JAMES T. GRAHAM,
T. B. MOSHER.